(12) United States Patent
Kron

(10) Patent No.: US 8,550,541 B1
(45) Date of Patent: Oct. 8, 2013

(54) AERODYNAMIC FITTINGS FOR TRAILER CROSSMEMBERS

(75) Inventor: Steven Todd Kron, Pewaukee, WI (US)

(73) Assignee: Steven Todd Kron, Pewaukee, WI (US)

( * ) Notice: Subject to any disclaimer, the term of this patent is extended or adjusted under 35 U.S.C. 154(b) by 0 days.

(21) Appl. No.: 13/609,274

(22) Filed: Sep. 11, 2012

(51) Int. Cl.
*B62D 35/00* (2006.01)

(52) U.S. Cl.
USPC .................................. 296/180.4; 296/180.1

(58) Field of Classification Search
USPC ................................ 296/180.1, 180.2, 180.4
See application file for complete search history.

(56) References Cited

U.S. PATENT DOCUMENTS

| 8,191,956 B1 * | 6/2012 | Dixon et al. | 296/180.4 |
| 8,366,180 B2 * | 2/2013 | Lee et al. | 296/180.4 |
| 8,376,450 B1 * | 2/2013 | Long et al. | 296/180.4 |
| 2011/0068605 A1 * | 3/2011 | Domo et al. | 296/180.4 |

* cited by examiner

*Primary Examiner* — Lori Lyjak

(57) ABSTRACT

The purpose of this device is to reduce the fuel consumption of heavy trucks by improving airflow along the underside of a trailer, using a series of rectangular panels to close the gaps between trailer crossmembers and create a continuous smooth surface. These panels are placed in between adjacent crossmembers and secured to their flanges using a plurality of clamping mechanisms. Each clamp is comprised of a U nut fitted to edge of the panel and a half clip that is bolted to the bottom. With the U nut clamping down on the topside of the flange and the half clip gripping the bottom surface of the crossmember, these clamps secure each panel in place. These fittings, requiring no modification to the crossmembers themselves, are easily installed and readily removable.

10 Claims, 5 Drawing Sheets

AERODYNAMIC FITTINGS FOR TRAILER CROSSMEMBERS

BACKGROUND OF THE INVENTION

Of the factors influencing the fuel economy of semi-trucks, aerodynamics is the field in which the greatest improvements might be most readily made. Of the two types of aerodynamic drag, friction drag and pressure drag, pressure drag has a particularly significant impact on heavy trucks, accounting for as much as 90% of drag force. On a standard, unmodified truck and trailer, approximately one third of this pressure drag is caused by the vehicle undercarriage.

When the elements which cause drag are essential structural components, they cannot be removed, displaced, or dramatically altered. Instead, aerodynamic fairings can be attached to the vehicle to improve airflow, thereby reducing drag and consequently fuel consumption.

The exposed crossmembers on the underside of a trailer are prohibitive to smooth, stable airflow. These I beams span the width of the vehicle, but are spaced approximately one foot apart, leaving regularly alternating gaps along the length of the trailer. Closing or otherwise covering these gaps would transform the uneven underside of the trailer into a smooth, flat surface, improving aerodynamic efficiency and minimizing turbulence.

As crossmembers are a key structural component of a trailer and must support tremendous weight, any aerodynamic attachments applied to the crossmembers must not undermine their structural integrity and will ideally leave them completely intact. Producing holes in the crossmembers could weaken them and increase the incidence of cracks or failures. Furthermore, the possibility of structural failure makes it preferable for the crossmembers to be at least partly visible, such that they can be inspected for weaknesses even with aerodynamic fittings installed.

It is also preferable that any such attachments do not prevent someone from accessing or servicing the underside of the trailer. If possible, these fairings should be readily removable, in whole or in part, so that one may conduct an inspection or perform maintenance as needed.

SUMMARY OF THE INVENTION

Figure 1:
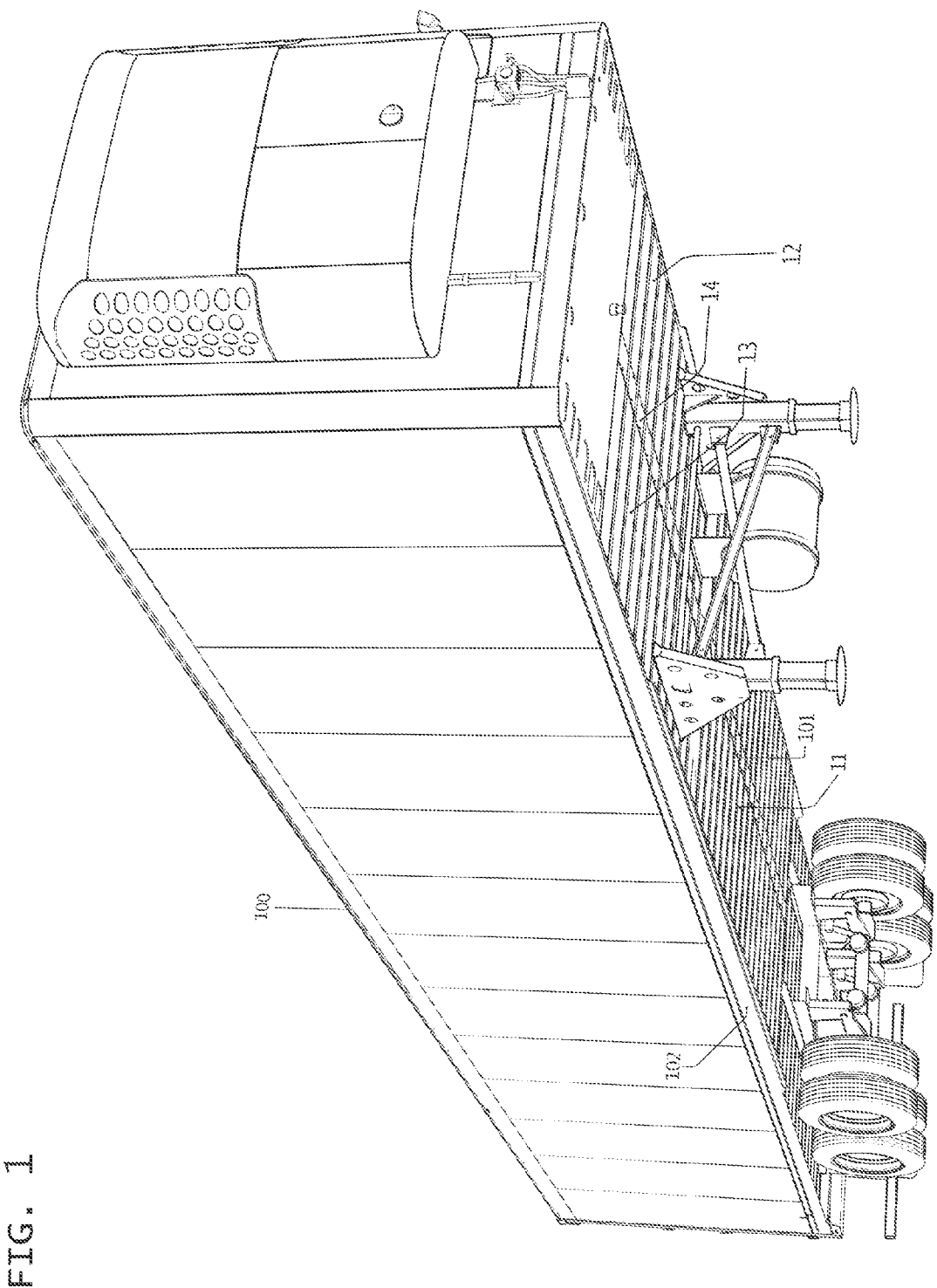
FIG. 1. Perspective view of the underside of a semi-trailer with the aerodynamic fittings installed in between the crossmembers.
Figure 2:
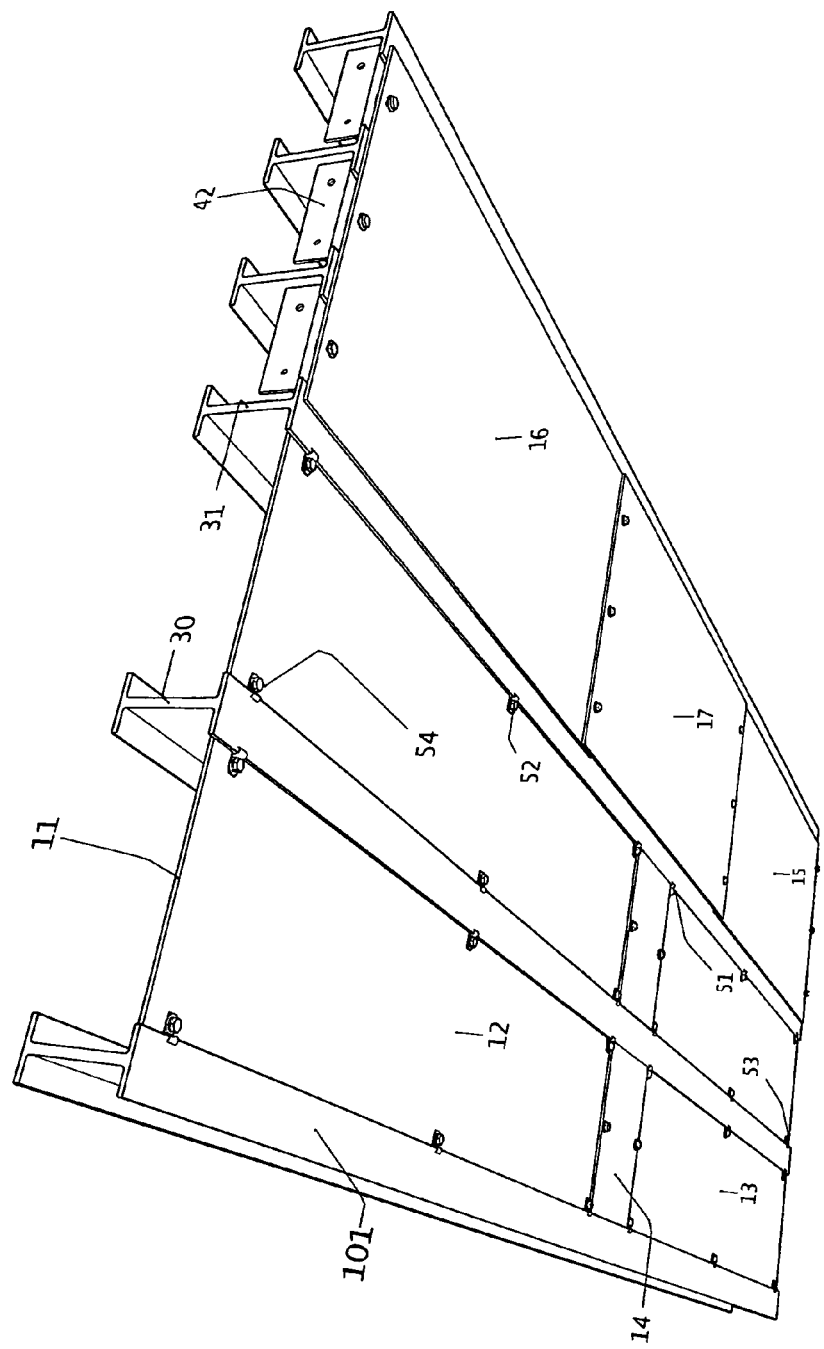
FIG. 2. Perspective view of the aerodynamic fittings attached to the crossmembers, as seen from the underside of the panels.
Figure 3:
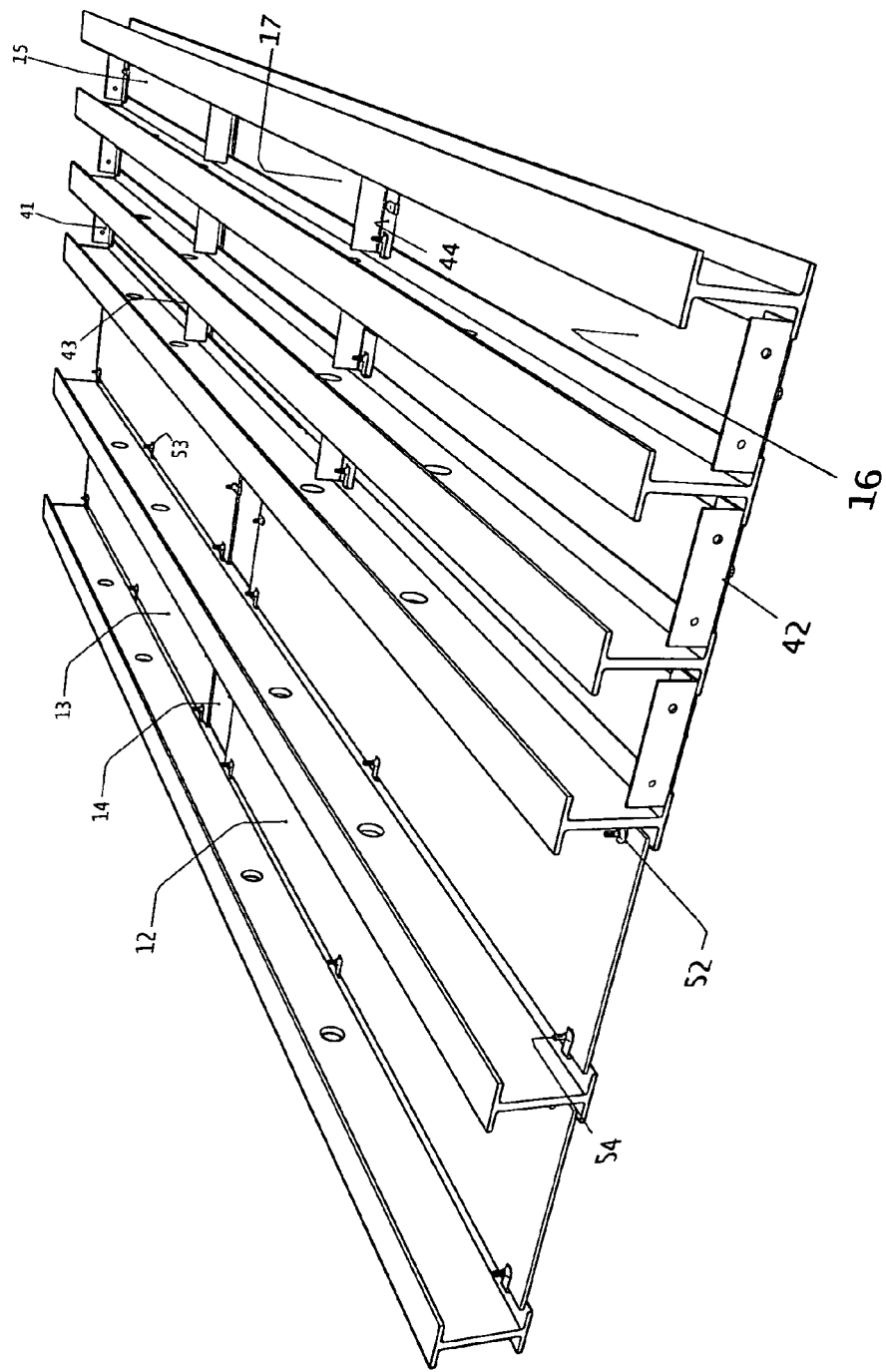
FIG. 3. Perspective view of the aerodynamic fittings, as seen from above the crossmembers.
Figures 4A, 4B:
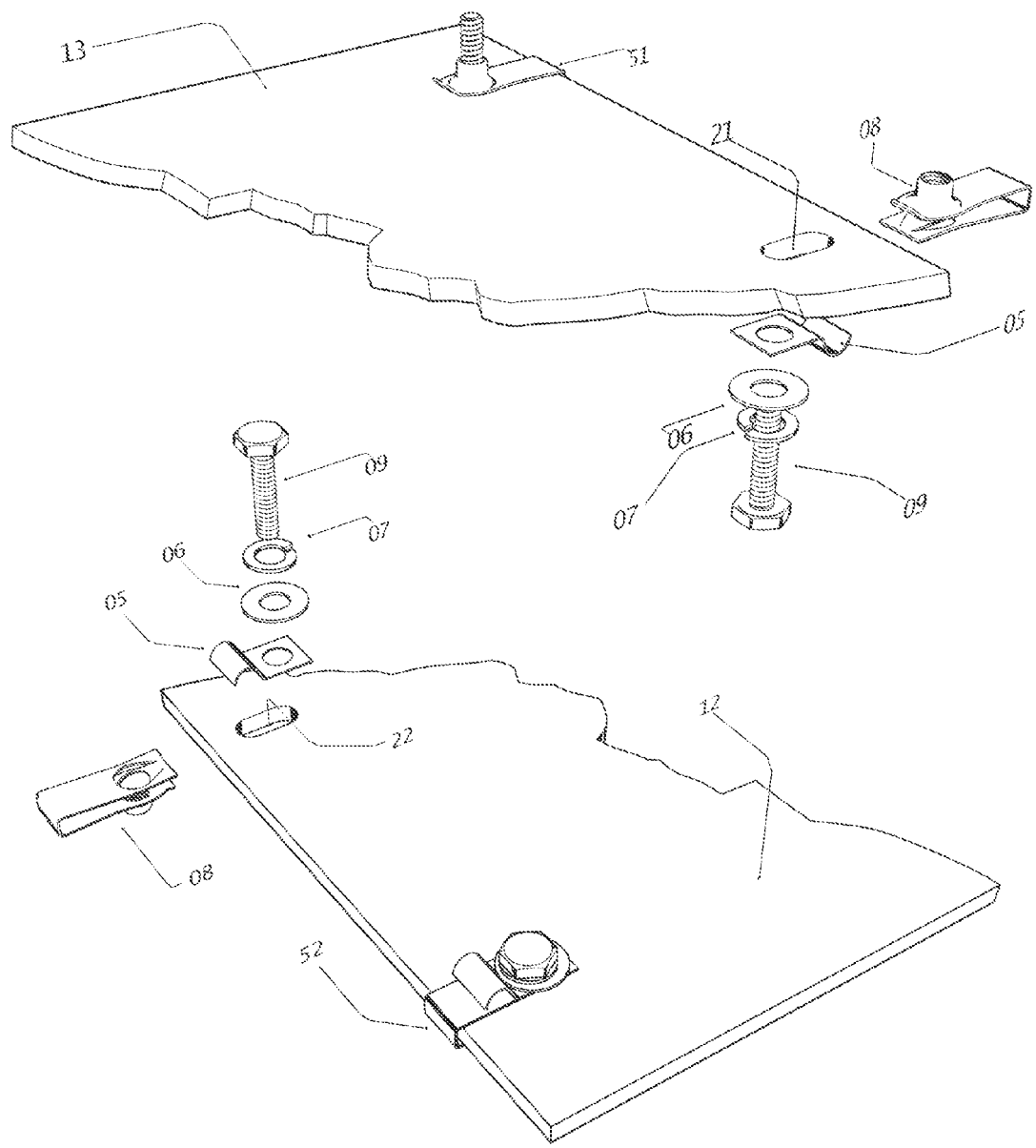
FIG. 4a. Exploded view of the clamping mechanism and a piece of the panel, as seen from the top (enclosed) side.
FIG. 4b. Exploded view of the clamping mechanism and a piece of the panel, as seen from the bottom (exposed) side.
Figure 5A:
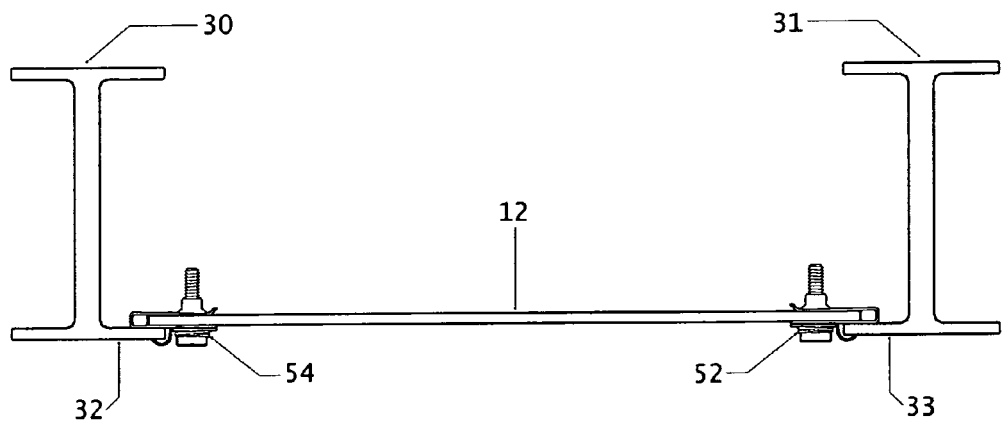
FIG. 5a. Cross section of two crossmembers, with a panel clamped in place between them.
Figure 5B:
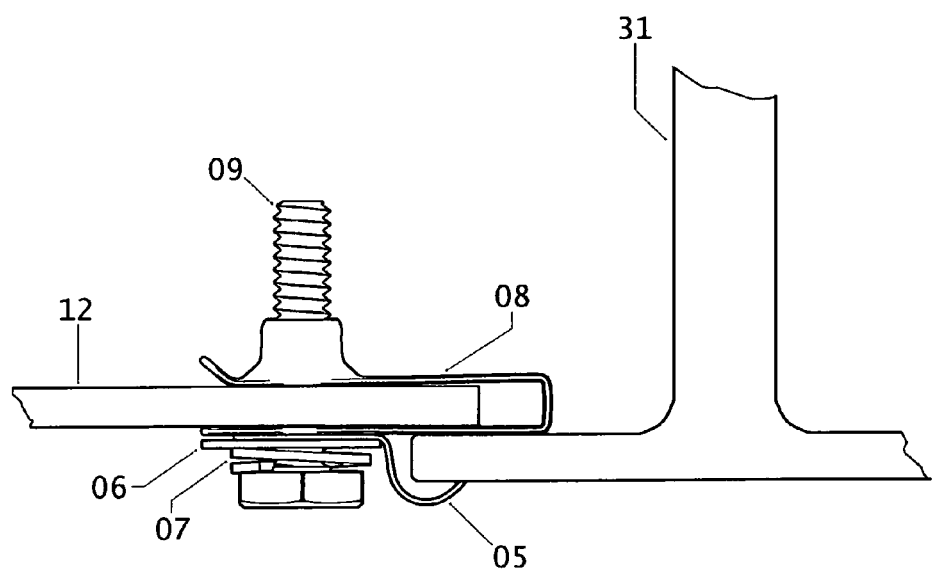
FIG. 5b. Side view of the assembled clamping mechanism, attaching a panel to a crossmember flange.

The invention consists of a series of panels that transform the uneven underside of a semi-trailer to a smooth surface by closing the gaps in between adjacent crossmembers with flat, rectangular, semi-rigid panels. Each panel measures less than the center to center distance between crossmembers and greater than the spacing between their respective flanges, such that the panels can be nested in between each crossmember and rest on top of their lower flanges.

Each panel is secured to the crossmember flanges by a plurality of clamping mechanisms. These clamping mechanisms consists of a U nut and a clamping element. The clamping element, which has an aperture and a gripping surface, is bolted to the panel through the U nut, whereby said gripping surface is pressed into the underside of the crossmember flange. With the U nut on the topside of the flange and the clamping element pressing against the bottom surface of the crossmember, they are bolted together to secure the panel in place.

DETAILED DESCRIPTION OF THE PREFERRED EMBODIMENT

In the preferred embodiment, aerodynamic fitting 11 consists of three panels clamped in between adjacent crossmembers 30 and 31. Primary panels 12 and 13 measure four feet long and are placed along the outer edge of trailer 100 up against siderails 102. As a trailer is 102 inches in width, this leaves a gap of approximately six inches in between the primary panels, along the central axis of the trailer. This gap is closed by auxiliary panel 14, which is bolted once to each primary panel 12 and 13.

The width of the primary panels is less than the center to center distance between crossmembers and greater than the space between their respective flanges, such that panels 12 and 13 more than span the gap between crossmembers 30 and 31, as measured from flange 32 to flange 33. For panels fitted to crossmembers with a center to center distance of one foot, these panels should measure between ten and eleven inches wide, with the optimal width of primary panels 12 and 13 being ten and three-eighths inches.

These panels are held in place with a plurality of clamping mechanisms, which consists of a U nut 08, a clamping element 05, a bolt 09, a washer 07, and a lock washer 06. The U nuts 08 fit on the edge of a panel over the plurality of slotted holes 21 and 22. These slotted holes allow for the U nuts to be slid in or out relative to the edge of the panel, effectively increasing or decreasing the width of the assembly to account for minor variances in the space between crossmembers.

Each primary panel 12 and 13 has a total of seven slotted holes. The three along the length of either side of panel 12 are designated for the plurality of clamping mechanisms 51 and 53, and panel 13 is a mirror image with three holes each for the plurality of clamping mechanisms 52 and 54. These slots allow the plurality of clamping mechanisms to be positioned forward or backward relative to the panel.

Panels 12 and 13 have an additional hole along the edge of the panel nearest the central axis of the trailer, through which panel 14 is attached, and panel 14 has a corresponding slot on either side. On panels 12 and 13, the axis of the slot is perpendicular to the neighboring edge. On panel 14, the slots are parallel to the edge of the panel, but perpendicular to the corresponding slots on panels 12 and 13. These slots allow auxiliary panel 14 to be positioned farther forward, backward, left or right relative to the primary panels, such that these holes can be made to coincide without requiring precise assembly.

As panel 14 is much smaller than panels 12 and 13, and is bolted only once on either side, it is relatively easy to remove or replace. This facilitates maintenance, allowing access to the underside of the trailer and the wiring that runs along its central axis, without removing other panels or dismantling the entire assembly.

Once panels 12 and 13 are fitted with U nuts, they are placed in between crossmembers 30 and 31 such that they rest on the top edge of crossmember flanges 32 and 33. Below each U nut 08, the remainder of the clamping mechanism is assembled from a clamping element 05, a bolt 09, a washer 07, and a lock washer 06. With U nut 08 on the topside of the flange and clamping element 05 pressed against the bottom surface of the crossmember, bolt 09 tightens the clamping mechanism and secures the panel in place.

In the preferred embodiment, the clamping element is a half clip, which is comprised of a flat surface, which has an aperture to receive a bolt, and a curved surface with a gripping edge. The curved surface of the half clip is bent around the edge of the crossmember, such that it grips the bottom surface of a flange 32 or 33 while the flat surface is pressed tightly against the U nut on the underside of the panel.

As the curved surface of the half clip 02 wraps around the edge of the flange on which a panel rests, its gripping surface contacts only bottom of the crossmember, such that the vector of the gripping force is normal to the bottom surface of the crossmember, independently of the flat surface through which half clip 02 is bolted to the panel. As half clip 02 has both a curved and a flat surface, it can directly grip the bottom of the crossmember and be fastened flat against the bottom of U nut 08 and the underside of the panel.

A clamping element that is uniformly flat, such as a fender washer, or that has an angled surface, such as a beveled washer, will press against the edge of the flange, rather than the bottom surface of the crossmember. The vector of this pressure is not parallel to the bolt nor normal to the bottom surface of the crossmember. The slight bend that results is acceptable, and does not undermine the aerodynamic efficiency of the fittings. However, if panels 12 and 13 are substantially bent as a result of this pressure, they may necessitate a third and fourth bolt to attach access panel 14.

On some parts of a trailer, where greater strength and structural integrity are required, crossmembers may be spaced closer together than one foot. In these cases, placing panels in between each crossmember would require as much or more than twice the number of clamping mechanisms and double the time required to install panels over a given area. As such, an alternative design and method of installation is preferable.

Instead of being placed in between adjacent crossmembers, panels 15, 16, and 17 span the distance between two or more crossmembers and cover them completely. These panels are not clamped directly to the crossmember flanges, but are bolted to a plurality of aluminum angles 41, 42, 43, and 44. The plurality of angles 43 and 44 are fastened to the crossmember flanges in the manner of panels 12 and 13 using the same clamping mechanism. The plurality of angles 41 and 42 are permanently attached to siderails 102 using rivets.

While this alternative method is useful in instances where the crossmembers are spaced close together, there is a downside to covering the crossmembers completely in that they cannot be easily inspected. As panels 12 and 13 are installed, they sit on top crossmember flanges 32 and 33, such that the bottom of the crossmembers are always visible. While most of crossmembers 30 and 31 are occluded by panels 12 and 13, leaving the crossmembers partially visible makes the primary method of installation less prohibitive to inspection.

What is claimed is:

1. Aerodynamic fittings for the underside of a trailer which consist of:
    at least one panel nested in between the crossmembers and a plurality of clamping mechanisms that secure said panel to said crossmembers;
    wherein said clamping mechanisms each consist of a U nut, wherein said U fits over the edge of said panel, and a clamping element, wherein said clamping element has an aperture and a gripping surface;
    and wherein said clamping mechanisms secure said panel to the lower flanges of said crossmembers, with said U nut on the top surface of a flange and said clamping element pressed against the bottom surface of said flange, such that said flange is clamped in between said U nut and said clamping element.

2. The aerodynamic fittings of claim 1, wherein said clamping element is chosen from a group consisting of half clips, beveled washers, and fender washers.

3. The aerodynamic fittings of claim 1, wherein said clamping mechanisms are further comprised of a washer and a lock washer.

4. The aerodynamic fittings of claim 1, wherein said clamping mechanisms are bolted to said panel through slotted holes.

5. The aerodynamic fittings of claim 1, wherein there is one panel on either side, and wherein said panels combine to span the entire width of said trailer.

6. The aerodynamic fittings of claim 1, wherein there is a panel on either side, and wherein this panel configuration spans less than the entire width of said trailer, such that there is a gap in between said panels.

7. The panel configuration of claim 6, wherein said gap is of a substantially shorter in length than said panel on either side, and wherein said gap is covered by an access panel of corresponding size.

8. The panel configuration of claim 7, wherein said access panel is removably attached to said panel on either side.

9. Aerodynamic fittings for the underside of a trailer which consist of:
    at least one panel that spans the gap between more than two crossmembers;
    a plurality of mounting surfaces, each of which spans the gap between two adjacent crossmembers, wherein said plurality of mounting surfaces are secured to said crossmembers using a plurality of clamping mechanisms, wherein said clamping mechanisms each consist of a U nut, wherein said U nut fits over the edge of said mounting surface, and a clamping element, wherein said clamping element has an aperture and a gripping surface;
    and wherein said panel is fixedly attached to said plurality of mounting surfaces.

10. The aerodynamic fittings of claim 9, wherein said plurality of mounting surfaces are aluminum angles, and wherein said aluminum angles are permanently attached to the trailer siderails.

* * * * *